United States Patent [19]

Sundberg et al.

[11] Patent Number: 4,605,235
[45] Date of Patent: Aug. 12, 1986

[54] HIGH THRUST CAPACITY SHAFT SEAL ASSEMBLY FOR FUEL PUMPS

[75] Inventors: Jack G. Sundberg, Meriden; Paul L. Haynes, Jr., Pleasant Valley, both of Conn.

[73] Assignee: Chandler Evans Inc., West Hartford, Conn.

[21] Appl. No.: 649,676

[22] Filed: Sep. 12, 1984

[51] Int. Cl.$^4$ .............................................. F16J 15/34
[52] U.S. Cl. ..................................................... 277/87
[58] Field of Search ................................. 277/81 R, 87

[56] References Cited

U.S. PATENT DOCUMENTS

| | | | |
|---|---|---|---|
| 3,552,752 | 1/1971 | Lojkutz | 277/87 |
| 3,578,344 | 5/1971 | Yost | 277/87 |
| 3,647,227 | 3/1972 | Lojkutz et al. | 277/87 |

*Primary Examiner*—Robert I. Smith
*Attorney, Agent, or Firm*—Radford W. Luther; Richard A. Dornon

[57] ABSTRACT

A shaft seal assembly (2) for a fuel pump includes a seal housing (4) attached to the fuel pump housing (6). A drive shaft (10) mounted for rotation in the fuel pump housing has a sealing face (14) which is engaged by a thrust face (42) of a thrust member (40) and by a seal face (18) of a carbon face seal (20). The thrust member and the carbon face seal are positioned with a steel carrier (26) mounted in the seal housing. A universal washer (32) is located between the carrier and the rear wall of the seal housing so that the carrier may undergo universal movement in response to movements of the thrust member. Misalignments between the axis of the shaft and the axis of the seal housing result in correspondng movements of the thrust member and the carrier which enable the axis of the face seal to remain aligned with the axis of the shaft. This arrangement permits the carbon face seal to be pressure balanced so that a relatively high fuel pressure surrounding the shaft will not produce unacceptable wear of the carbon face seal.

7 Claims, 6 Drawing Figures

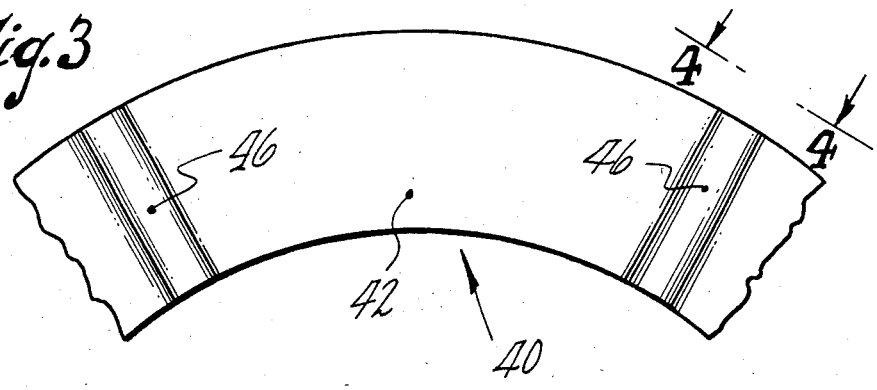
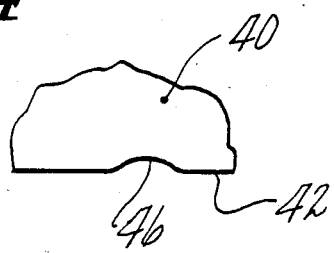
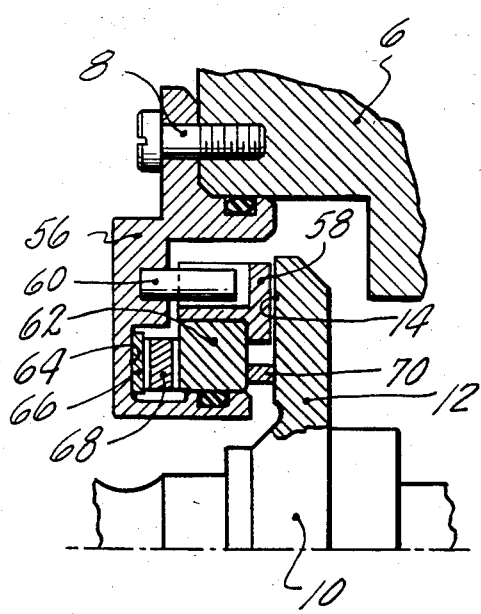
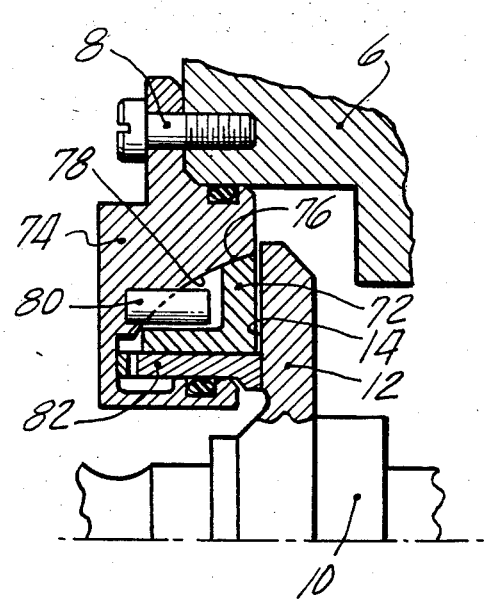

4,605,235

HIGH THRUST CAPACITY SHAFT SEAL ASSEMBLY FOR FUEL PUMPS

TECHNICAL FIELD This invention relates to shaft seals, and more particularly to shaft seals for aircraft engine fuel pumps.

BACKGROUND ART

Aircraft engine fuel pumps have, in recent years, been required to provide higher pressures, operate at higher speeds and furnish increased performance characteristics with regard to such factors as fuel heating. Various pump stages, in turn, require higher charging pressures due to higher speeds. Hence, it is no longer possible to subject shaft seals to low fuel pressures because such low fuel pressures beget unacceptable leakage of fuel from the pump bearings to the seal cavity which occasions an excessive temperature rise in the inlet fuel. Instead, shaft seals in state-of-the-art aircraft engine fuel pumps must be referenced to the inlet pressure of a high pressure stage of the pump.

Conventional shaft seal assemblies, such as illustrated in U.S. Pat. No. 4,417,734, exhibit eminently satisfactory performance when the seal cavities are referenced to low pressures. However, when the seal cavities in conventional shaft seal assemblies are exposed to higher pressures, the annular seal face portion of the carbon face seal experiences significant wear which eventually causes leakage. The reason for such wear of the annular seal face portion is that the contigerous annular thrust face portion of the carbon face seal (which has grooves or slots therein) is well-supplied with lubricating fuel while the annular seal face portion which is exposed to same sealing pressure of the sealing face of the runner (or shaft flange) runs at a higher temperature with far less lubrication.

DISCLOSURE OF INVENTION

In accordance with the invention, there is provided for the shaft of a fuel pump a shaft seal assembly having a carbon face seal with an annular seal face and a separate and independent thrust member or thrust bearing having an annular thrust face. In a seal assembly invention, universal action is provided such that the carbon face seal and thrust member move in unison to accommodate non-axial shaft alignments whereby the seal face of the carbon face seal will always remain parallel to the sealing face of the shaft to insure the essential surface-to-surface sealing engagement.

A seal assembly of the invention is advantageous since the thrust member may be of an optimum design and the carbon face seal may, if desired, be of a pressure balanced design. It will be appreciated that a pressure balanced seal construction is ordinarily highly desirable to minimize loads on the seal face of the carbon face seal.

Accordingly, it is a primary object of the invention to provide a shaft seal assembly with a face seal and a separate and independent thrust member.

Another object is to provide a shaft seal assembly for an aircraft engine fuel pump in which the seal cavity is referenced to a high fuel pressure.

These and other objects and advantages of the invention will become more readily apparent from the following detailed description when taken in conjunction with the accompanying drawings, in which:

BRIEF DESCRIPTION OF DRAWINGS

FIG. 3 is a rear elevational view of the thrust member of the shaft seal assembly of FIG. 1, taken substantially along the line 3—3 thereof.

FIG. 4 is a fragmentary peripheral view of the thrust member as it would appear looking radially inwardly along the line 4—4 of FIG. 3.

FIGS. 5 and 6 are respective fragmentary side elevational views of two further embodiments of shaft seal assemblies of the invention.

BEST MODE OF CARRYING OUT THE INVENTION

Figure 1:
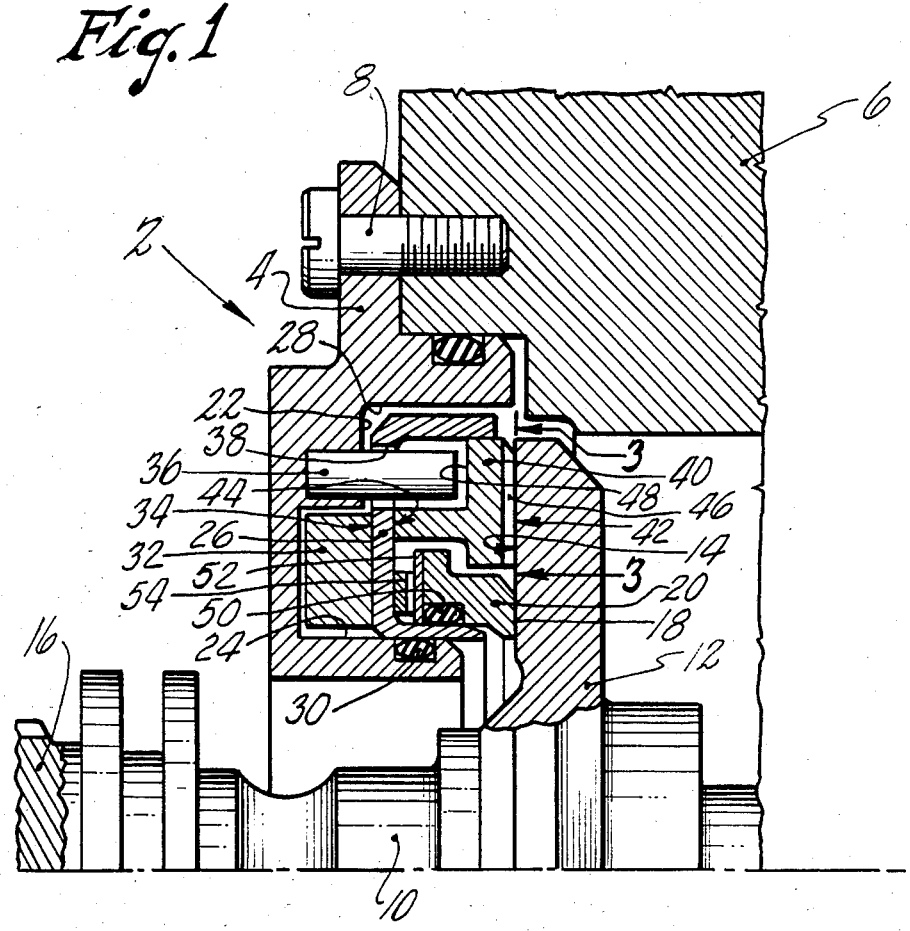
FIG. 1 is a fragmentary side elevational view of a shaft seal assembly according to the invention.

With reference to FIG. 1, there is shown a shaft seal assembly of the invention, generally indicated at 2, installed in an aircraft engine fuel pump. The seal assembly 2 of FIG. 1 includes a seal housing 4 secured to the pump housing 6 by means of bolts 8. A pump drive shaft 10, having a flange or runner 12 with a sealing face 14 formed thereupon, extends into the housing 6 in a direction away from its splined end 16 where it is in driving connection with a rotating pump component such as a gear or the like. When the pump is operating normally, fuel pressure forces urge the shaft 10 to the left or toward its splined end 16 as is the case in a typical fuel pump. The pressure behind the flange, however, is considerably higher than the pressure to be found in similar locations in older fuel pumps to minimize bearing leakage and hence undesireable fuel heating. The necessary sealing action to prevent fuel from leaking to the pump exterior is furnished by the engagement of the seal face 18 of a carbon face seal 20 and the sealing face 14 of the flange 12 during engine starting and normal engine operation.

From FIG. 1, it will be seen that the seal housing 4 has an annular cavity therein formed by a rear cavity 22 and a front cavity 24 which opens into the rear cavity. Mounted within the rear cavity 22 is an annular steel carrier 26 which is channel-shaped in cross section and has an annular recess 28 therein. The radially inner circumferential periphery of the steel carrier abuts the radially inner wall of the cavity 22 and engages an O-ring seal 30 disposed in a groove in the seal housing 4. The carrier 26 may tilt in any direction whereby its axis may always remain coincident with that of the shaft 10. Directly in front of the carrier 26 and within the front cavity 24 is mounted a universal or gimbal washer 32 (sometimes termed a dimpled washer) which engages the front outer wall 34 of the carrier 26 to permit the aforementioned universal tilting of the carrier 26. The universal washer, which is depicted in FIG. 4, is of conventional construction and incorporates four protuberances (two diametrically opposed protuberances on each side with ninety degree spacing therebetween) to enable it to pivot about any axis orthoginal to the axis of the shaft 10. Rotation of the carrier 26 is prevented by a dowel 36 mounted in the seal housing 4 and projecting inwardly therefrom. The dowel 36 extends through an aperture 38 in the carrier 36 and into the recess 28.

An annular thrust member 40, having a thrust face 42, is mounted within the recess 28 in the carrier 26. The front surface of the thrust member 40 is in abutting relationship with the rear inner wall 44 of the carrier 26 and the rear thrust face 42 is adapted to engage the sealing face 14 of the runner 12 during normal pump operation. The thrust member 40 is preferably made of leaded bronze; and the thrust face embodies grooves 46 as best illustrated in FIGS. 3 and 4. Rotation of the thrust member 40 is prevented by the end of the dowel 36 which is received within a slot 48 therein. During non-axial shaft alignments the thrust face 42 will always remain in engagement (full surface-to-surface contact) with sealing face 14 of the runner 12, thereby forcing the thrust member 40, and hence the carrier 26, to assume orientations which correspond to the non-axial shaft alignments.

The annular carbon face seal 20 is mounted in the carrier 26 for axial movement parallel to the axis of the shaft 10. A portion of the radially inner surface of the carbon face seal 20 is slidable over the radially inner wall of the recess 28. An O-ring seal 50, positioned in a groove in the radially inner surface of the carbon face seal 20 contacts the radially inner wall of the recess 28. As shown in FIG. 1, the carbon face seal 20 is shaped to provide a pressure balance configuration and is in spaced relationship to the thrust member 40. A washer 52 abuts the front or non-sealing face of the carbon face seal 20 and is urged thereagainst by a spring washer 54 interposed between the washer 52 and the rear inner wall 44 of the carrier 26. It will thus be appreciated that the only force urging the seal face 18 of the carbon face seal 20 against the sealing face 14 of the runner 12 is that furnished by the spring washer 54. Because, the axial loads impressed upon the carbon face seal 20 are minimal, no positive antirotation means are provided although it is, of course, within the ambit of the invention to provide such means.

Because the axis of the carrier is forced to remain parallel to the axis of the shaft 10 by the action of the thrust member 40, the axis of the carbon face seal is similarly constrained to remain parallel to the axis of the shaft. Hence, during shaft misalignments, the seal face 18 of the carbon face seal 20 should remain parallel to and in surface-to-surface contact with the sealing face 14 of the runner 12.

During engine starting, the carbon face seal is held in engagement with the sealing face 14 of the runner 12 by the urging of the spring washer 54. At this time the seal face 18 is projecting slightly rearwardly of the thrust face 48 which is spaced from the sealing face 14 of the runner 12. As engine speed increases, fuel pressure acting on the rear or right side of the runner 12 correspondingly increases until it overcomes the spring force of the spring washer 54, whereby the shaft 10 moves to the left. Movement of the shaft 10 to the left results in leftward axial movement of the carbon face seal 20 and washer 52. Leftward axial movement of the carbon face seal terminates when sealing face 14 engages the thrust face 48 of the thrust member 40. Thereafter, alignment variations in the shaft 10 are accommodated by the universal motion of the carrier 26, whereby there is surface-to-surface engagement between the sealing face 14 of the runner and the seal face 18 of the carbon face seal 20.

Figure 2:
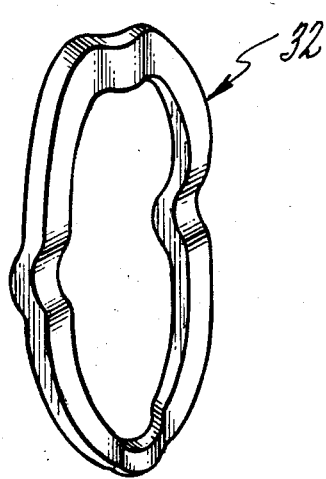
FIG. 2 is a perspective view of the universal washer incorporated in the shaft seal assembly of FIG. 1.

FIG. 5 shows another embodiment of the invention wherein a seal housing 56 has a thrust member 58, similar to that of FIG. 1, mounted therein, the rotation of which is prevented by a dowel 60. A face seal in the form of a purch seal 62 is seated within the thrust member 50 whereby movements of the thrust member are directly transmitted to the seal 62 without the utilization of a carrier as in the embodiment of FIG. 1. Behind the rear inner wall 64 of the seal housing 56 is positioned a washer 66 which, together with the front surface of the purch seal 62, defines a space in which a universal washer 68 (such as shown in FIG. 2) is mounted. The universal washer 68 permits universal motion of the purch seal 62 which has the usual spring loaded carbon sealing element 70 having a seal face in engagement with the runner sealing face 14.

FIG. 6 shows yet another embodiment of the invention wherein a thrust member 72 is mounted within a seal housing 74 for universal motion therein. The thrust member 72 has a peripheral bearing surface 76 shaped as a spherical segment which is in engagement with a bearing surface 78, also shaped as a spherical segment, formed in the seal housing 74 to allow for universal motion of the thrust member. As is the case with the other embodiments, a dowel 80 prevents rotation of the thrust member 72. A carbon face seal 82, mounted in the seal housing 74, has its outer periphery in engagement with the inner periphery of the thrust member 72 whereby universal motion of the thrust member is transmitted thereto. A spring washer 84 is interposed between the rear wall 86 of the seal housing 74 and the front face of the carbon face seal to urge the seal into engagement with the sealing face 14 of the runner 12.

Obviously, many modifications and variations are possible in light of the above teachings without departing from the scope or spirit of the invention as defined in the appended claims. For example, instead of the spherical bearing arrangement of FIG. 6, it would also be possible to place a universal washer between the thrust member and the housing and provide alternative antirotation means.

We claim:

1. In an improved shaft seal assembly for a pump having a pump housing and a drive shaft with a sealing face extending therein of the type comprising: a seal housing mounted upon the front of the pump housing in surrounding relationship to the drive shaft, a face seal, having its seal face in wiping engagement with the sealing face, mounted in the seal housing such that it is and capable of universal motion and wherein the improvement comprises:

a thrust member having a thrust face mounted in the seal housing for universal motion with respect thereto and such that its thrust face engages the sealing face during normal pump operation;

means to prevent rotation of the thrust member with respect to the seal housing; and means to transmit movements of the thrust member to the face seal such that misalignments between the seal housing and the axis of the drive shaft produce corresponding displacements in the axis of the face seal.

2. The improvement of claim 1, wherein the movement transmitting means comprises:

a carrier mounted in the seal housing for universal motion, the thrust member and the face seal being mounted in the carrier in radially spaced relationship.

3. The improvement of claim 1, wherein the rotation preventing means comprises:

a dowel mounted in the housing and extending through the carrier, the dowel being received by the thrust member in such a manner as to prevent any rotation thereof.

4. In an improved shaft seal assembly for a pump having a pump housing and a drive shaft with a sealing face extending therein of the type comprising: a seal housing mounted upon the front of the pump housing in surrounding relationship to the drive shaft, a face seal, having its seal face in wiping engagement with the sealing face, mounted in the seal housing such that it is and capable of universal motion wherein the improvement comprises:

- a thrust member having a thrust face mounted in the seal housing for universal motion with respect thereto and such that its thrust face engages the sealing face during normal pump operation;
- means to prevent rotation of the thrust member with respect to the seal housing; and
- the face seal being mounted in the seal housing such that it is in engagement with the thrust member whereby movements of the thrust member caused by misalignments between the seal housing and the axis of the shaft will produce corresponding displacements in the axis of the face seal.

5. The improvement of claim 4, wherein the face seal comprises:

- a purch seal; and wherein the improvement further comprises:
- a universal washer mounted in the seal housing in engagement with the purch seal to permit universal motion of the purch seal and the thrust member.

6. The improvement of claim 4, wherein the face seal comprises:

- a carbon face seal; and wherein the improvement further comprises:
- a spring washer mounted in the housing in engagement with the carbon face seal to urge the seal face into contact with the sealing face; and
- the thrust member and the seal housing having engaged bearing surfaces shaped as spherical segments to permit movements of the thrust member caused by misalignments between the seal housing and the axis of the shaft.

7. A method of sealing the drive shaft of a pump having a pump housing and a seal housing mounted thereupon in which the drive shaft is mounted for rotation in the pump housing which comprises the steps of:

- engaging a sealing face on the drive shaft with a thrust member contained in the seal housing;
- moving the thrust member when the axis of the seal housing and the drive shaft axis become misaligned so that the axis of the thrust member remains aligned with the axis of the shaft; and
- transmitting movements of the thrust member to a face seal with a seal face in engagement with the sealing face such that the axis of the face seal remains aligned with the axis of the shaft.

* * * * *